July 31, 1962     A. H. BAYER     3,047,190

BEER FERMENTING TANK

Filed April 29, 1959     2 Sheets-Sheet 1

INVENTOR.
August H. Bayer.
BY Wood, Herron & Evans.
ATTORNEYS.

July 31, 1962  A. H. BAYER  3,047,190
BEER FERMENTING TANK
Filed April 29, 1959  2 Sheets-Sheet 2
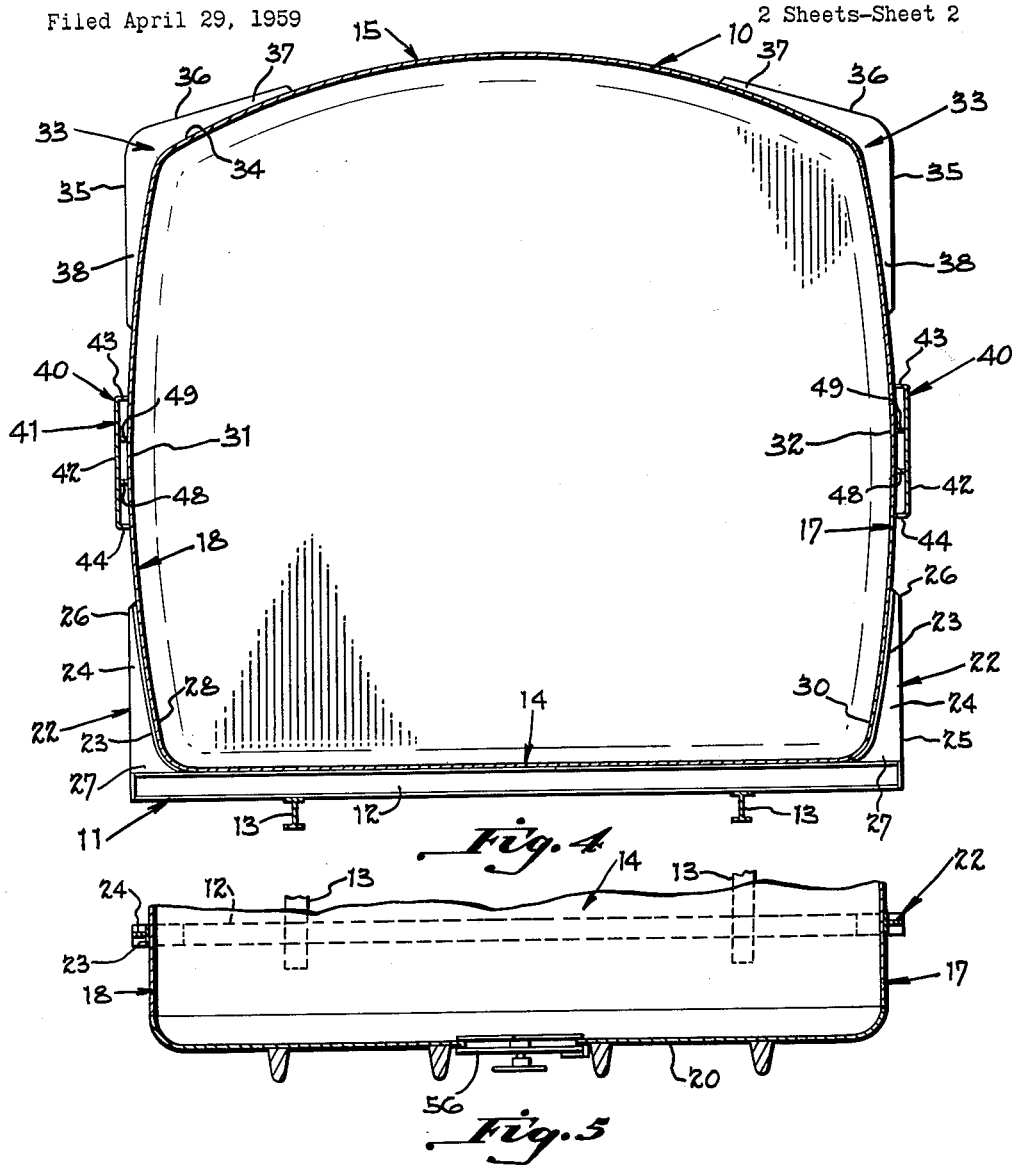
INVENTOR.
August H. Bayer.
BY
Wood, Herron & Evans.
ATTORNEYS.

United States Patent Office 3,047,190
Patented July 31, 1962

3,047,190
BEER FERMENTING TANK
August H. Bayer, Cincinnati, Ohio, assignor to The Bishopric Products Company, Cincinnati, Ohio, a corporation of Ohio
Filed Apr. 29, 1959, Ser. No. 809,862
8 Claims. (Cl. 220—71)

This invention relates to storage tanks and is particularly directed to a novel closed fermenting tank for use in the brewing industry.

It is common practice in breweries to use fermenting tanks in which beer is fermented for an appreciable length of time under controlled pressure and temperature conditions. While the size of these tanks varies, a typical fermenting tank is adapted to contain 1300 barrels of beer. The tank is substantially filled with beer except for an air space at the top of the tank to permit collection of gases produced during the fermentation process. It will readily be appreciated that the walls of the fermentation tank are thus subjected not only to the hydrostatic loads caused by the contained liquid, but in addition are subjected to stresses induced by the resultant gas pressure.

In the past, it has been conventional in breweries to construct fermentation tanks of rectangular cross-section and to provide a plurality of spaced reinforcing ribs which extend completely around the tank; i.e., across the top and bottom walls and upwardly along the side walls of the tank. While tanks of this type have proved to be satisfactory from a strength standpoint, they utilize an excessive amount of floor space for a given capacity because of the reinforcing members on the sides of the tank.

It is an important object of the present invention to provide a fermenting tank in which a maximum usable capacity is obtained for the floor space occupied by the tank. Thus, a tank constructed in accordance with the principles of the present invention provides approximately eight percent more capacity than a tank having the same overall dimensions of the conventional type referred to above.

The present invention is predicated in part upon the concept of providing a tank structure in which only the upper and lower portions of the side walls are reinforced to resist stresses as a beam, while the center portions of the side walls are intentionally left unreinforced, are slightly curved, and are made of a relatively thin material so that these walls undergo large deflections and thus function as membranes.

More particularly, one preferred form of tank constructed in accordance with the principles of the present invention comprises a bottom member which is supported on a plurality of spaced transverse I-beams, or box type sections. Two arcuate side walls are welded to the bottom, and to a top, and end members to form a closed tank. The side walls are reinforced by a plurality of spaced upper and lower stiffener members which extend upwardly approximately ¼ of the height of the tank from the bottom of the tank and downwardly approximately ¼ of the height of the tank from the top. Thus, the upper and lower portions of the side walls of the tank adjacent to these stiffeners function as a beam; i.e., members adapted to resist sizable bending stresses. The center portions of the tank side walls, however, are completely unreinforced and these portions of the side walls, which are curved outwardly and are thinner than the side walls of conventional tanks, are adapted to deflect outwardly an appreciable amount; for example, more than one inch for a 3/16 of an inch side wall. This portion of each side wall thus functions mechanically as a "membrane"; that is, a member which may be subjected to large tensile stresses (which the side walls can readily resist without yield), but is not subjected to sizable bending stresses (which the side walls could not resist without yield).

Additionally, in accordance with the present invention, the lower stiffener members are of tapered configuration having a wide base adjacent to the bottom portion of the tank and a narrow upper end. Thus, these reinforcing members function as cantilever beams having a greater outward deflection adjacent at their upper ends than at their lower ends so that the reinforcing members help to provide a smooth transition in the side walls between the areas of the side walls which function as a "beam" and those areas of the side wall which function as a "membrane."

In further accord with this invention, each of the upper stiffener members is of double tapered configuration including one arm extending downwardly along the upper portion of the side walls, and a second arm extending along the top wall. Each of the tapered arms function as a cantilever beam and thereby facilitate a smooth stress transition.

Another object of the present invention is to provide a tank having external attemperator means. More particularly, it is well known that during the fermenting process a certain amount of heat is developed which tends to raise the temperature of the beer above the optimum temperature for fermentation. Accordingly, it is conventional to provide on the interior of a fermentation tank an elongated attemperator coil through which a coolant liquid is circulated to remove excess heat and maintain the beer at a predetermined temperature. One of the obvious difficulties with interior coils of this type is that of cleaning the surface of the coil to keep it in a sanitary condition.

In a tank constructed in accordance with the present invention, the internal attemperator coil is eliminated and is replaced by one or more external cooling jackets mounted longitudinally of the tank side walls at the center, unreinforced portions of these walls.

The present external cooling jacket comprises a channel shaped jacket and two end members welded directly to a side wall of the tank together with a plurality of baffle members which define a tortuous fluid path within the coolant jacket. Suitable inlet and outlet connections are made to the jacket so that in operation a coolant liquid is introduced into the jacket, flows in a tortuous path through the jacket in direct heat exchange relationship with the side walls of the tank and eventually emerges through a coolant outlet. I have determined that external coolant jackets of this type are extremely effective in maintaining the fermenting beer at the desired temperature.

One of the principal advantages of an external coolant jacket of this type is that the interior of the tank is completely free from any coils, or the like. This, together with the curved tank walls which eliminate corners, makes the present tank extremely easy to clean and maintain in a sanitary condition.

Another advantage of the present tank is that despite its larger capacity, it is less expensive to produce than a conventional rectangular tank of the same overall size, due to the thinner walls employed and the elimination of the full height reinforcing members.

These and other objects and advantages of the present invention will be more readily apparent from a consideration of the following detailed description of the drawings illustrating a preferred embodiment of the invention.

In the drawings:

FIGURE 4 is a cross-sectional view taken along line 4—4 of FIGURE 2.

FIGURE 5 is a cross-sectional view taken along line 5—5 of FIGURE 3.

Figure 1:
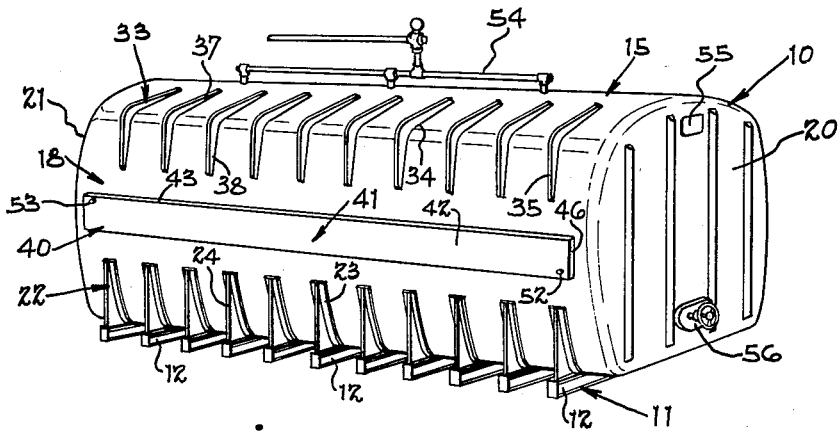
FIGURE 1 is a perspective view of a fermenting tank constructed in accordance with the principles of the present invention.

As is shown in FIGURE 1, a preferred form of fermenting tank 10 constructed in accordance with the principles of the present invention is of generally rectangular shape in cross section and is mounted upon a base 11. The tank is particularly intended for use in pressure fermenting in the brewery industry, in which use the tank is substantially filled with fermenting beer which develops a gas pressure of from one to five pounds per square inch. It is to be understood, however, that tanks of the present type can be advantageously used in installations having a lower or higher gas pressure.

Figure 2:
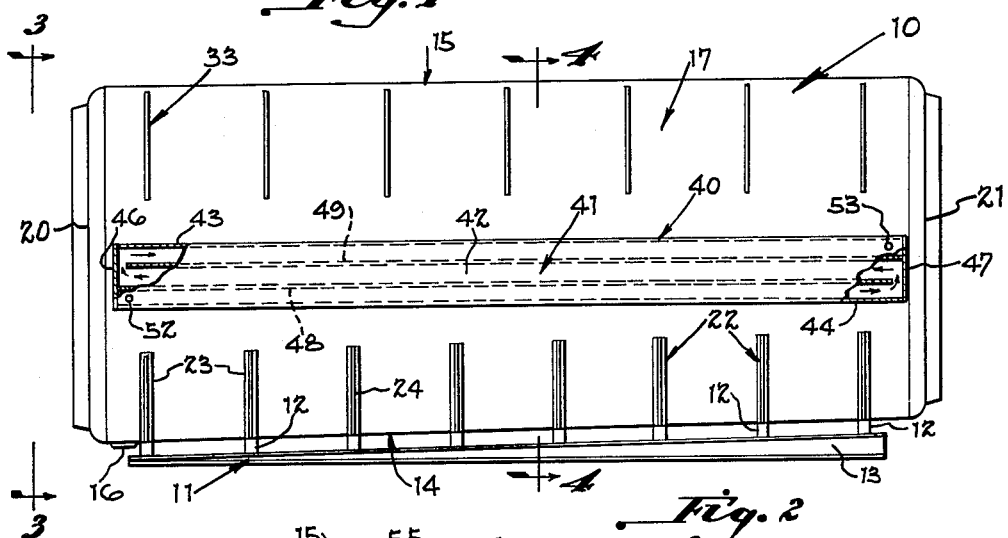
FIGURE 2 is a side elevational view of the tank shown in FIGURE 1.
Figure 3:
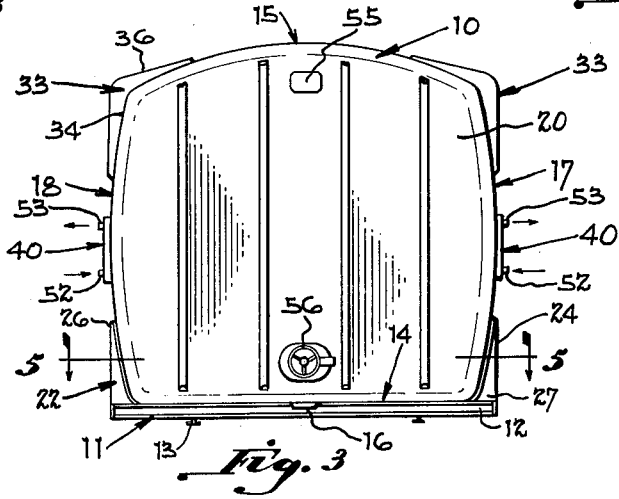
FIGURE 3 is an end view of the tank.

As is best shown in FIGURE 2, the base structure 11 for the tank comprises a plurality of transversely disposed I-beams or box shaped members 12 which extend beneath the tank at uniformly spaced intervals. The transverse I-beams 12 are welded to bottom plate 14 and are in turn mounted upon two longitudinally extending tapered I-beams 13 effective to raise the height of one end of the tank, which is slightly tapered, above the height of the other end of the tank so that the bottom of the tank slopes toward the outlet connection 16. It will readily be appreciated that any other conventional support structure can be employed if desired. For example, the transverse I-beams 12 can be supported on independent support members or jacks of adjustable height.

The tank 10 is formed of suitable metal plates, such as carbon steel plates, of the order of ¼ of an inch in thickness. More particularly, one preferred form of tank comprises a 3/16 inch top plate indicated generally at 15, a ¼ inch bottom plate indicated generally at 14, and ¼ inch side plates indicated generally at 17 and 18. These plates are welded together in any suitable manner and are secured by welding to front and rear end plates 20 and 21. After assembly, the interior surfaces of the closed tank are coated with a suitable protective, non-corrosive coating, such as "Lastiglas." It will readily be appreciated, however, that it is possible to fabricate tanks in accordance with the present invention from stainless steel or other non-corrosive metal in which case it is unnecessary to line the interior of the tank walls.

The side walls 17 and 18 of the tank are slightly curved as is best shown in FIGURE 4. This curvature is necessary in order that the center portions of the side walls may function as membranes; i.e., as members in which the tensile stresses are so large in comparison with the bending stresses that the latter can be neglected. In one preferred embodiment of the tank the radius of this wall is eighteen feet. The exact radius, however, is not critical so long as the radius is small enough in relation to the thickness of the side walls and the pressure on the tank interior that the deflection of the center portion of the side walls exceeds five times the thickness of the plate which is the minimum deflection present in a member stressed as a membrane.

The lower portion of the side walls adjacent the juncture of the side walls 17 and 18 and bottom wall 14 are reinforced by a plurality of spaced lower stiffener members 22. Each of these lower stiffener members is identical and is preferably T-shaped in cross-section, although these members can be box shaped if desired. Each stiffener member includes a transverse flange 23 and a web 24 extending outwardly at right angles to the transverse flange. The transverse flange 23 extends upwardly along the side wall of the tank preferably for a distance equal to approximately ¼ the height of the tank wall.

Each of the transverse I-beams 12 extends outwardly beyond the side edges of the bottom 14 of the tank a sufficient distance to support webs 24 of the stiffeners. The outer edge 25 of each web is preferably vertical so that the web tapers from a narrow upper portion 26 to a wide bottom portion 27. The bottom portion 27 of the web is welded in any suitable manner to the projecting end of a transverse I-beam 12. Each of the lower reinforcing members functions as a cantilever beam and is effective to reinforce and rigidify the lower-most portions 28 and 30 of the side walls 17 and 18 so that those portions of the side walls function as a beam resisting outward deflection of the lowermost portions of the side walls. However, due to the taper of web portions 24, the upper-most end of each stiffener 22 is deflected outwardly by the internal pressure of the tank so that the side walls 17 and 18 undergo a gradual transition from the beam stresses in portions 28 and 30 to the membrane stresses in the middle portions 31 and 32.

In addition to the lower stiffeners 22, the tank is reinforced by a plurality of spaced upper stiffeners 33. These upper stiffeners are formed of a suitable plate material, such as a ⅜ inch plate. The stiffeners are provided with an inner edge 34 which conforms to the shape of top plate 15 and the upper portion of side walls 17 and 18. The upper stiffeners 33 preferably have angulated side and top edges 35 and 36 which together with inner edge 34 define tapered horizontal and vertical arms 37 and 38. Arm 38 preferably extends downwardly approximately ¼ of the height of the side walls 17 and 18.

In use, the present tank is usually substantially filled with liquid; however, the liquid does not completely fill the tank so that there is an air or gas collecting space above the top surface of the liquid. During the fermenting process, the gas pressure developed in this space usually ranges between 1–5 p.s.i. This pressure as well as the pressure due to the weight of liquid in the tank acts upon the bottom and side walls of the tank. The bottom and the upper and lower portions of the side walls resist deflection as beams; i.e., members adapted to withstand sizable bending stresses without yield, while the center portions of the side walls between the upper and lower stiffeners function as membranes or "balloons."

Thus, these members deflect outwardly an appreciable amount; for example, more than an inch for a 3/16 inch thick wall. However, because of the thinness of the walls and the relatively large deflection, the tensile stresses in the neutral plane of the central portions of the side walls are large in comparison with the bending stresses which are not of significance. Thus, these unreinforced portions of the tank walls are subjected to large tensile stresses which the walls can withstand without yield, but are not subjected to large bending stresses which would cause yield.

It will readily be appreciated that by making the side walls thin and only slightly curved, the present tank provides a maximum capacity for a given amount of floor space. This capacity is seven or eight percent more than the capacity of a conventional rectangular tank utilizing side stiffeners.

The present fermenting tank has no internal attemperator coils. Instead, the temperature of the fermenting liquid is maintained at the desired level by means of two externally disposed cooling jackets 40—40 mounted upon side walls 17 and 18. Each of these two cooling jackets is identical in construction and extends longitudinally of the tank for substantially the entire length of the side walls. Each cooling jacket is preferably disposed vertically at approximately the center portion of the walls between the upper stiffener members 33 and lower stiffener members 22.

Each of the cooling jackets 40 comprises a generally U-shaped channel, or jacket, member 41 having an outer wall 42 and two short transverse walls 43 and 44, the ends of which are welded to the side walls 17 and 18 of the tank. The ends of the cooling jacket are closed by end walls 46 and 47. In addition to the channel or jacket member, the cooling jacket comprises two or more baffle members 48 and 49. These baffle members extend longitudinally of the cooling jacket for substantially the entire length thereof. However, the baffle members are alternately spaced from end walls 46 and 47 of the cooling jacket to define a tortuous flow path for the circulating coolant. More specifically, baffle member 48 is joined to end wall 46 and extends longitudinally of the tank to a point spaced from end wall 47; while baffle member 49 is joined to end wall 47 and extends longitudinally of the tank to a point spaced from end wall 46. Suitable piping connections are provided for connecting the cooling jacket to a coolant inlet line 52 and a coolant outlet line 53. The coolant fluid thus enters the cooling jacket from line 52, flows in a sinuous path through the jacket in heat exchange relation with the adjacent tank wall, and flows outwardly through outlet pipe 53, as indicated by the arrows in FIGURE 2.

It has been found that the external cooling jackets of the present invention are just as effective as the internal attemperator coils conventionally employed. However, because the present cooling jackets are disposed on the outside of the tank, the problem of maintaining the tank interior in a sanitary condition is greatly simplified.

In addition to these elements, the present fermenting tank includes suitable piping connections 54 for an automatic spray cleaning unit. The front wall 20 of the tank is fitted with a transparent observation window 55 and a manhole cover 56. These latter elements are conventional and constitute no part of the present invention.

From the foregoing disclosure of the general principles of the present invention and the above description of a preferred embodiment, those skilled in the art will readily comprehend various modifications to which the invention is susceptible. Therefore, I desire to be limited only by the scope of the following claims.

Having described my invention, I claim:

1. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, the lower ends of said lower reinforcing members being rigidly interconnected to the transverse beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

2. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, the lower ends of said lower reinforcing members being rigidly interconnected to the transverse beams, said upper reinforcing members also being rigidly secured to said top wall, each of the upper and lower reinforcing members extending vertically along the side walls for a distance of between one fourth and one third of the height of said side walls, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

3. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, the lower ends of said lower reinforcing members being rigidly interconnected to the transverse beams, each of said lower reinforcing members being tapered and having a wide bottom portion and a narrow upper portion, whereby said lower stiffener members function as cantilever beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

4. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, the lower ends of said lower reinforcing members being rigidly interconnected to the transverse beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure, and an elongated cooling jacket extending horizontally along said side wall and mounted upon the center portion of a side wall, said cooling jacket defining a coolant flow path in heat exchange relationship with said side wall.

5. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, and including portions extending outwardly beyond the bottom wall of said tank, said side walls being curved outwardly in vertical plane adjacent to the center portions thereof, and a plurality of vertically extending horizontally spaced upper and lower reinforcing members respectively secured to the top and bottom portions of each of the side walls, the lower end of each of said lower reinforcing members being mounted upon one of the transverse beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side walls when a tank is placed under pressure.

6. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, and including portions extending outwardly beyond the bottom wall of said tank, said side walls being curved outwardly in vertical plane adjacent to the center portions thereof, and a plurality of vertically extending horizontally spaced upper and lower reinforcing members respectively secured to the top and bottom portions of each of the side walls, each of said lower stiffener members comprising a transverse flange in engagement with said side wall and a web extending outwardly from said flange, the lower end of each of said lower reinforcing members being mounted upon one of the transverse beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

7. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, each of said lower stiffener members being mounted upon one of said transverse beams and extending upwardly along said side wall for a fraction of the height thereof, each of said lower stiffener members comprising a transverse flange in engagement with said side wall and a web extending outwardly from said flange, said web tapering from a wide bottom edge to a narrow upper portion, said upper reinforcing members also being rigidly secured to said top wall, said upper reinforcing member engaging the top portion of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

8. A fermenting tank of generally rectangular cross section, said tank having a thin metal bottom, a thin metal top, thin metal side walls interconnecting the bottom and top, and end members joined to the bottom, side, and top walls to form a closed tank, a plurality of transverse beam members disposed beneath said tank, said beam members being secured to said thin metal bottom wall, said side walls being curved outwardly in vertical plane adjacent to the center portions thereof, and a plurality of vertically extending horizontally spaced upper and lower reinforcing members respectively secured to the top and bottom portions of each of the side walls, each of said upper stiffener members including a tapered arm extending downwardly from the upper portion of said side walls, the lower ends of said lower reinforcing members being rigidly interconnected to the transverse beams, said upper reinforcing members also being rigidly secured to said top wall, said reinforcing members engaging the top and bottom portions of each of said side walls over an appreciable vertical extent, the upper and lower reinforcing members being spaced vertically from one another, the center portion of each of said side walls not being reinforced, the upper and lower portions of each of said side walls being effective to function as beams resisting outward deflection, the thickness of the side walls and the radius thereof being sufficiently small so that the center portion of each of said side walls functions as a membrane and deflects an amount in excess of four times the thickness of the side wall when a tank is placed under pressure.

References Cited in the file of this patent
UNITED STATES PATENTS

| | | |
|---|---|---|
| 1,332,908 | Lloyd | Mar. 9, 1920 |
| 1,983,355 | Escher | Dec. 4, 1934 |
| 2,036,276 | Hothersall | Apr. 7, 1936 |
| 2,160,360 | Hassan | May 30, 1939 |
| 2,349,096 | Jackson | May 16, 1944 |
| 2,477,831 | Schmitz | Aug. 2, 1949 |
| 2,596,043 | Piker | May 6, 1952 |
| 2,675,940 | Schmitz | Apr. 20, 1954 |